United States Patent [19]

Watanabe et al.

[11] Patent Number: 5,352,876

[45] Date of Patent: Oct. 4, 1994

[54] METHOD AND APPARATUS FOR TRANSACTION SETTLEMENT

[75] Inventors: Masakatsu Watanabe, Kyoto; Yoshiyuki Konno, Tokyo, both of Japan

[73] Assignees: Tokyo Coca-Cola Bottling Co., Ltd., Tokyo; Omron Corporation, Kyoto, both of Japan

[21] Appl. No.: 57,011

[22] Filed: May 5, 1993

Related U.S. Application Data

[63] Continuation of Ser. No. 644,506, Jan. 23, 1991, abandoned.

[30] Foreign Application Priority Data

Jan. 24, 1990 [JP] Japan .................................. 2-014372
Oct. 27, 1990 [JP] Japan .................................. 2-289613

[51] Int. Cl.5 .............................................. G06F 7/08
[52] U.S. Cl. ...................................... 235/381; 235/379; 235/380; 902/5; 902/11
[58] Field of Search ............... 235/379, 380, 381, 382, 235/382.5; 902/5, 11

[56] References Cited

U.S. PATENT DOCUMENTS

| | | | |
|---|---|---|---|
| 4,614,861 | 9/1986 | Paulou et al. | 235/380 |
| 4,650,978 | 3/1987 | Hudson et al. | 902/5 |
| 4,900,903 | 2/1990 | Wright | 235/381 |
| 4,912,310 | 3/1990 | Uemara | 235/382 |
| 4,968,873 | 11/1990 | Defltloff | 902/11 |

Primary Examiner—Harold Pitts
Attorney, Agent, or Firm—Dickstein, Shapiro & Morin

[57] ABSTRACT

A pre-paid vending machine (10) includes a card reader (15) which reads credit data and secret code number from a credit card (11). When a user inputs a secret code number and amount data from an input display (16), whether or not the input secret code number is the same as the secret code number read from the credit card is checked. If the numbers are the same, the input secret code number, the amount data and the like are transmitted to a credit center (13), where it is determined whether or not a credit can be granted. If the credit can be granted, the input amount data is magnetically recorded on the ID card (12) as a credit amount, whereby the ID card can be used as a pre-paid card. When a user buys a thing by inserting the ID card to an automatic vending machine (20), the price of the thing is subtracted from the credit amount of the ID card.

17 Claims, 3 Drawing Sheets

METHOD AND APPARATUS FOR TRANSACTION SETTLEMENT

This application is a continuation of application Ser. No. 07/644,506 filed Jan. 23, 1991 now abandoned.

BACKGROUND OF THE INVENTION

1. Field of the Invention

The present invention relates to a method and an apparatus for transaction settlement. More specifically, the present invention relates to a method and an apparatus for transaction settlement allowing purchase of things at stores and by automatic vending machines in a company by using ID cards issued for identification of individuals in the company.

2. Description of the Background Art

A method of transaction settlement allowing purchase of things on credit for post payment by using ID cards for identification of individuals in the company has been disclosed in, for example, Japanese Patent Laying-Open 60-54695.

A method allowing purchase of things by using pre-paid cards issued in the company has been also known.

In the former case, the settlement of post payment must be done in the company, which is very troublesome.

In the latter case, issuance of the pre-paid card is done by the company which includes treatment of cash, which is also very troublesome. Direct use of credit cards has been proposed. However, individual verification, determination of validity of the card and confirmation With the credit company must be Carried out every time a credit card is used. If a function for directly receiving a credit card is added to each automatic vending machine or to a sales processing terminal at each store, telephone circuits connected to the credit card must be provided for every automatic vending machine and every terminal at the store. Therefore, the automatic vending machine and the sales processing terminals at stores are rendered large scale and complicated. Provision of the necessary telephone circuits increases cost. In addition, much time is required for communication with the credit company every time one purchases things on credit, which increase wait time for purchase.

SUMMARY OF THE INVENTION

Therefore, an object of the present invention is to provide a method and apparatus for transaction settlement having simple structure to reduce running cost, facilitate practical processing in company and enabling effective use of ID cards.

Briefly stated, in the present invention, amount data required for margin transaction recorded on a credit card is read by a card reading/writing machine, and read amount data settled by the credit card is written on an ID card. Every time a margin transaction of a certain amount is done by using the ID card, the data of the amount used in the margin transaction is subtracted from the amount data written in the ID card.

Therefore, in accordance with the present invention, since the amount data required for margin transaction is read from the credit card and written to the ID card, individual verification, determination of validity of the card, and confirmation with credit company are necessary only when the amount data is recorded on the ID card. Therefore, telephone circuits connected with the credit company have only to be provided at specified devices, enabling reduction in running cost.

In a preferred embodiment of the present invention, a secret code number has been stored in advance in the credit card. When the secret code number is input from an input portion, whether or not the input secret code number is the same as the secret code number read from the credit card is determined, and if they are the same, amount data input from the input portion is transmitted to a center where determination as to whether margin transaction is possible is done. If margin transaction is possible, the input amount data is written to the ID card.

Therefore, in the preferred embodiment of the present invention, the amount data input from the input portion can be written to the ID card, provided that the amount is within the limit of amount data settled in accordance with the data required for margin transaction recorded in the credit card.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
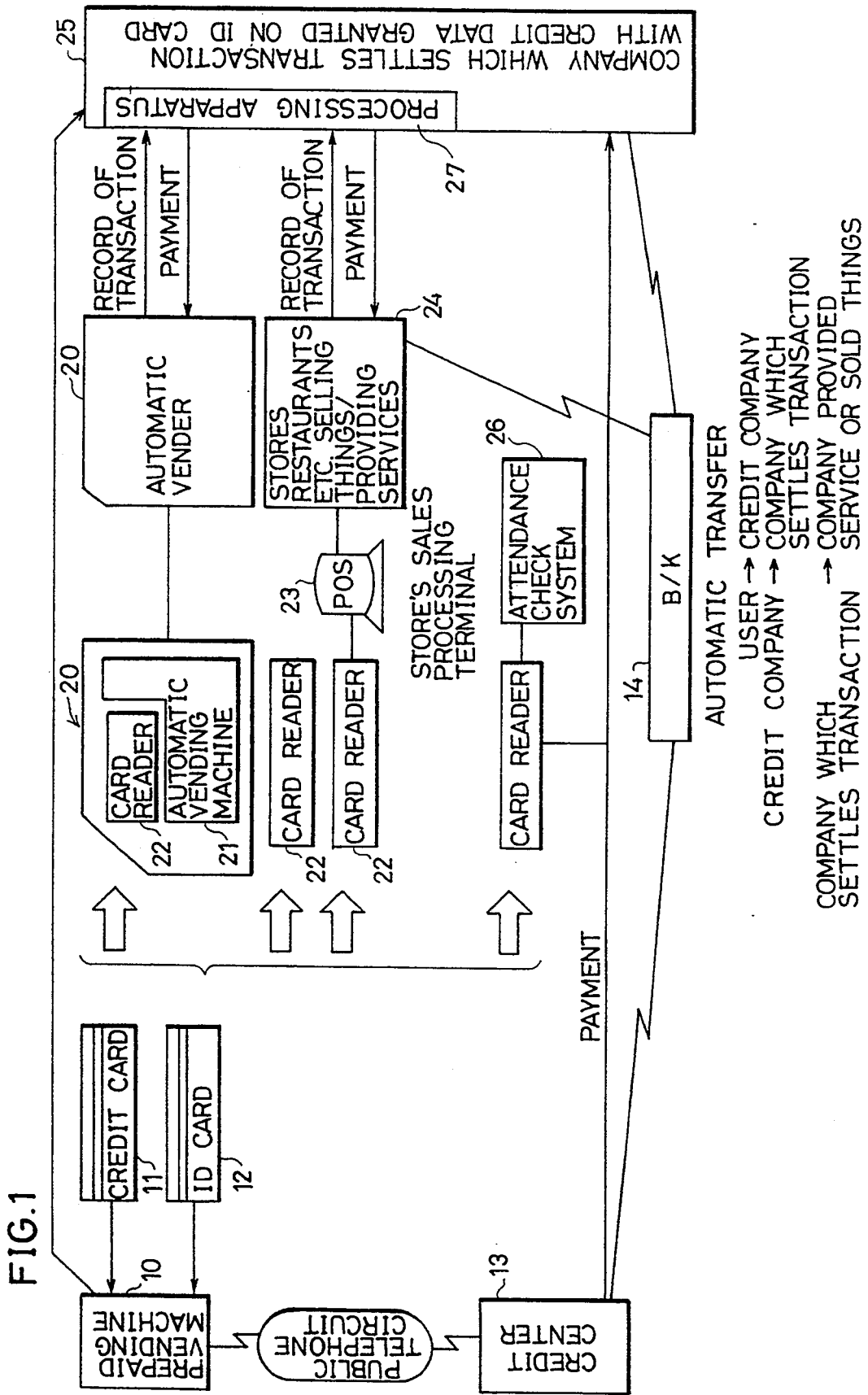
FIG. 1 is a schematic diagram showing the transaction settlement system in accordance with one embodiment of the present invention.

FIG. 1 is a schematic diagram for describing the outline of the whole transaction settlement system in accordance with one embodiment of the present invention. Referring to FIG. 1, a pre-paid vending machine 10 is adapted to receive a credit card 11 and an ID card 12. Data required for margin transaction allowed to the user of the card (hereinafter referred to as credit data) is magnetically recorded on the credit card 11 in advance. The pre-paid vending machine 10 reads the credit data from the credit card 11, records the received data on the ID card 12, so as to enable use of the ID card 12 as a pre-paid card. The credit card 11 is issued by a credit company (an example of an organization granting margin transaction) of which the customer is a subscriber. In order to enable use of the credit card 11, the pre-paid vending machine 10 is connected on-line to the credit center 13 through a public telephone circuit, and the credit center 13 is connected to a bank 14 on-line, in which bank the customer has an account. The above mentioned ID card 12 is issued by the company for individual identification, used for checking attendance, for determining admission of the gate of the company and so on.

Figure 2:
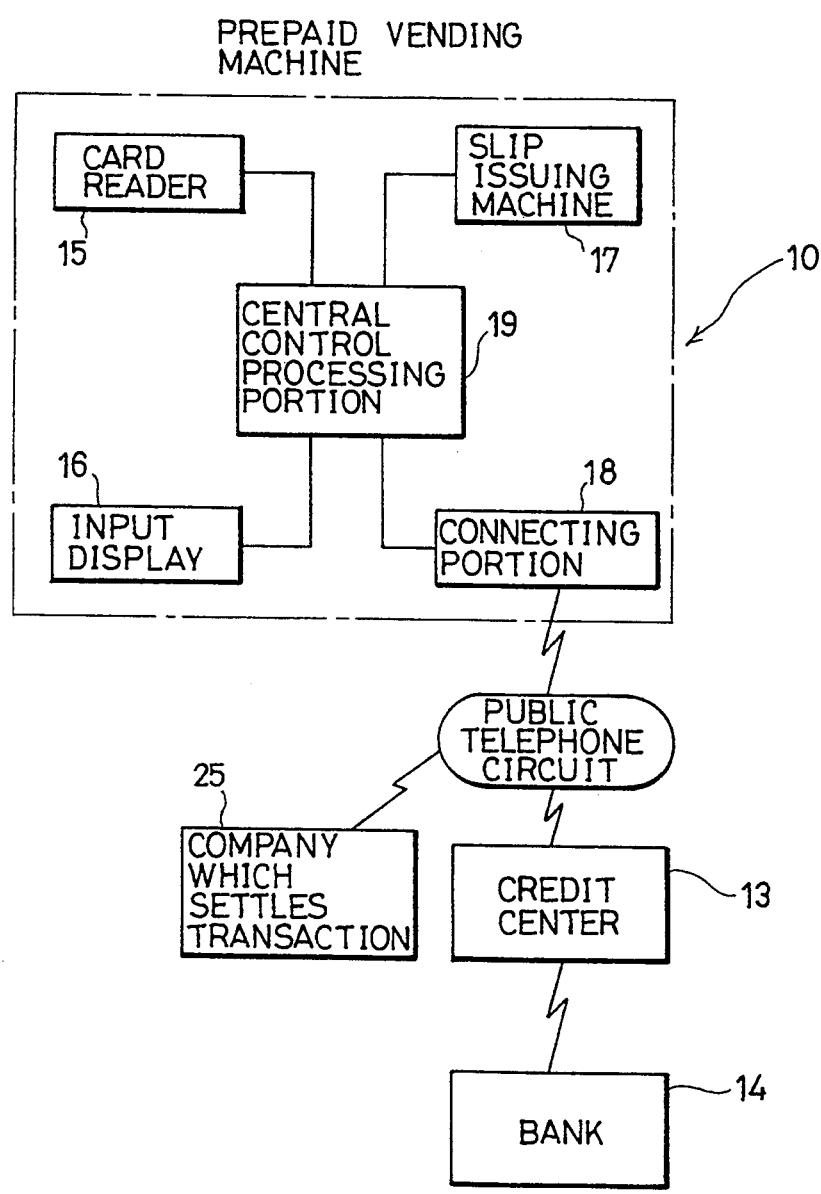
FIG. 2 is a schematic diagram of a pre-paid vending machine.

FIG. 2 is a schematic block diagram of the pre-paid vending machine shown in FIG. 1. Referring to FIG. 2, the pre-paid vending machine 10 comprises a card reader 15, an input display 16, a slip issuing machine 17, a connecting portion 18 and a central control processing portion 19. The card reader 15 receives the credit card 11 and the ID card 12 for carrying out magnetic processing such as reading and writing of the magnetic data. The input display 16 enables input of the secret code number and the credit data of the credit card 11 and display of data, which include a keyboard or a touch panel and a CRT display. The slip issuing machine 17 prints out data of transaction such as provision of the credit data. The connecting portion 18 includes an automatic dialing apparatus or the like connected through a public telephone circuit to the credit center 13. The card reader 15, the input display 16, the slip issuing machine 17 and the connection portion 18 are connected to the central control processing portion 19 to be controlled by this portion 19.

Figure 3:
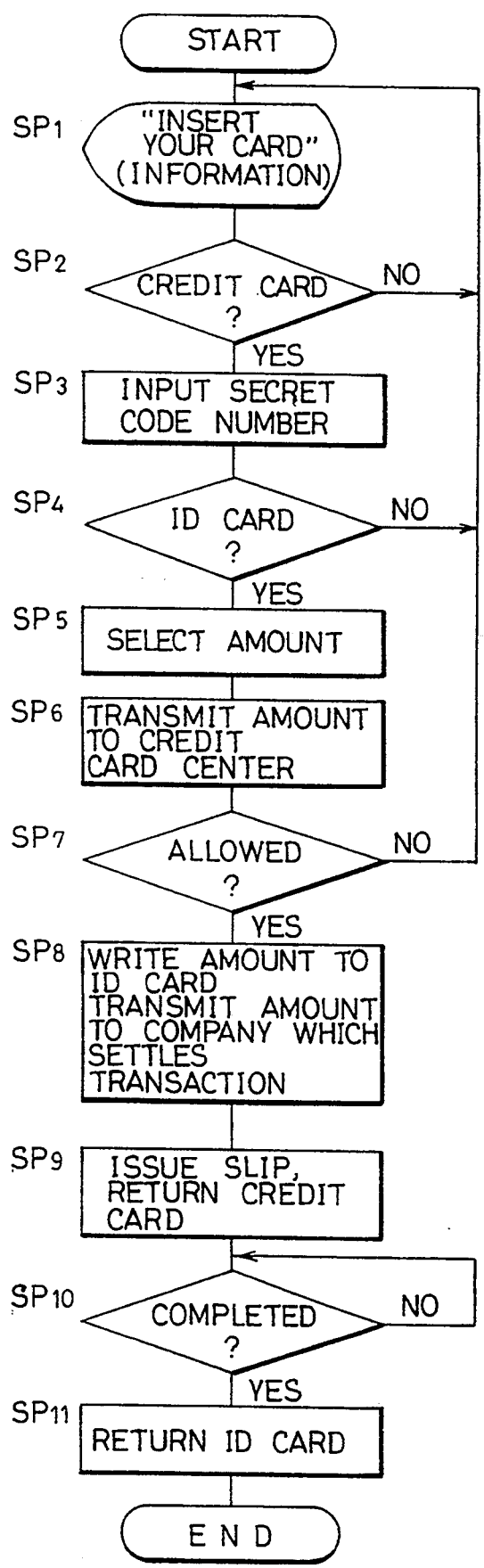
FIG. 3 is a flow chart showing the operation of the pre-paid vending machine.

FIG. 3 is a flow chart showing the operation of the pre-paid vending machine.

Referring to FIGS. 1 to 3, a specific operation of one embodiment of the present invention will be described. In step SP1 copy (referred to as SP in the figure), the central control processing portion 19 gives an information display on the input display 16 so as to urge a customer (an employee of the company) insertion of the credit card 11 and the ID card 12. The customer inserts the credit card 11 and the ID card 12 to the card reader 15. Then, in step SP 2, the central control processing portion 19 determines whether or not a credit card 11 is inserted. When insertion of the credit card 11 is confirmed and card data of the credit card 11, that is, credit company number, credit account number, secret code number and other data necessary for credit transaction are read by the card reader 15, the central control processing portion 19 provides a display on the input display 16 urging input of the secret code number of the credit card 11.

In step SP3, the customer inputs the secret code number through the touch panel of the input display 16. The central control processing portion 19 determines whether or not the input secret code number is the same as the secret code number read from the credit card 11. In step SP4, when it is confirmed that the ID card 12 is inserted, the central control processing portion 19 provides a display on the input display 16 to urge input of credit amount.

In step SP5, the customer operates the touch panel the input display 16 to input desired credit amount. When the credit amount is input, the central control processing portion 19 calls the credit center 13 by the automatic dialing apparatus of the controlling portion 18 to transmit the credit amount data as well as the above mentioned credit card data in step SP6, so as to confirm whether or not the credit can be granted, that is, whether or not settlement of the credit amount by the credit card is possible.

In step SP7, if it is determined by the central control processing portion 19 that the above mentioned settlement is impossible, the credit card 11 and the ID card 12 are returned to reject the transaction. If the settlement is possible, the central control processing portion 19 allows the card reader 15 to magnetically record the credit amount input by the customer as the credit data on the ID card 12, and transmits the credit amount to the company 25 which is to settle the transaction.

Recording of the credit data may be realized by providing a magnetic stripe used only for the pre-paid transaction on the opposite surface of the ID card 12 on which the individual identification data is recorded, so that the credit data is magnetically recorded on the specific recording portion. Alternately, the credit data may be magnetically recorded on a space of the individual identification data.

In step SP9, the central control processing portion 19 makes the slip issuing machine 17 print out the content of transaction and to emit the slip thereof, and then returns the credit card 11. If it is confirmed in step SP10 that the card is returned, the central processing portion 19 returns the ID card 12 from the card reader 15 in step SP11, thus completing the pre-paid sales.

The credit center 13 settles the transaction by transfer of the amount corresponding to the credit amount from the bank account of the customer.

Referring to FIG. 1, the ID card 12 granted the use as a pre-paid card can be used in restaurants in the company, used for checking attendance and for determining admission of the gate as the original ID card, and in addition, in can be used for purchasing things by directly inserting the same to automatic vending machines 20. It can be also used at stores for settlement of purchase by inserting the ID card 12 to a card reader 22.

The above mentioned automatic vending machine 20 contains a card reader 22 for carrying out magnetic processing such as reading of the credit data on the ID card 12, updating of the reduced credit data and so on, in addition to the conventional mechanism 21 for automatic vending. When the ID card 12 is inserted to the card reader 22, the credit amount data is read by the card reader 22, and when the customer selects things for purchase, whether or not the purchase is possible is determined. If it is possible, the price of the thing is subtracted from the credit amount, and the remaining amount is magnetically recorded as the up-dated credit data. Similar processing is carried out when a card reader is employed at a store.

As described above, in accordance with the embodiment, credit data is provided from the credit card 11 to the ID card 12 issued to every employee in the company by the pre-paid vending machine 10, so that individual verification, determination of the validity and the confirmation with the credit center 13 for allowing the use of the credit card 11 are necessary only when the credit data is provided.

Therefore, the telephone circuit connected to the credit center 13 has only to be provided on the pre-paid vending machine 10, thereby reducing the cost. The time required for communication with the credit center 13 is only the time of processing in the pre-paid vending machine 10, and accordingly wait time for purchase by the automatic vending machine 20 or by the card reader 22 at the store is the same as that of a common pre-paid card. Namely, the user can buy things immediately. Further, what is necessary on the side of the automatic vending machine 20 or the card reader 22 at the store is only a system for receiving the ID card 12 of one type. Therefore, the system is not complicated, treatment of cash can be avoided, handling of the system is easy and the cost thereof is reduced.

The system using the ID card 12 can be applied for sales and provision of services at stores, restaurants and the like other than the automatic vending machine 20. The card reader 22 may be combined with a general ECR, or the card reader 22 may be communicated with a POS 23 or the like, for sales processing, when the card is applied for sales and provision of services.

Further, the ID card 12 can be used not only for the general use in the company but also for transactions such as buying things- When the reminder of the given credit data is reduced, it can be up-dated by the pre-paid vending machine 10, which enables effective use of the card.

The record of use of the automatic vending machine, i.e., sales of things and provision of services is transmitted to the company 25 which settles the transaction, and the company 25 pays the equivalent. The amount of payment and prescribed commission are transferred from the account of the customer to that of the credit company. The credit company transfers that amount, with the prescribed commission subtracted, to the account of the company to which the customer belongs.

The company 25 which settles the transaction stores the history of the credit data in the pre-paid vending machine 10 every time the credit data is granted, so as to surely and correctly settle the transaction, and the company has a processing apparatus 27 for storing the history of transaction information. The processing apparatus 27 stores the history of transaction information on sales of things and provision of services every time the information is granted. An ID card can be used as the IC card 12.

Although the present invention has been described and illustrated in detail, it is clearly understood that the same is by way of illustration and example only and is not to be taken by way of limitation, the spirit and scope of the present invention being limited only by the terms the appended claims.

What is claimed is:

1. A system for transaction settlement, said system comprising:
    (A) card processing means for receiving a credit card and an ID card, and a telephone circuit for providing communication between said card processing means and a credit center, said card processing means including:
        (a) reading means for reading information recorded on the credit card;
        (b) determining means for determining whether a margin transaction is possible, said determining means being responsive to the information recorded on the credit card, said determining means also being responsive to information received from the credit center through said telephone circuit; and
        (c) writing means for writing a prepaid amount on the ID card, said writing means being responsive to a determination made by said determining means that the margin transaction is possible; and
    (B) transaction processing means including means for reading the ID card, subtracting means for subtracting a transaction amount from the prepaid amount on the ID card, and means for performing a transaction responsive to the reading of the ID card.

2. A system for transaction settlement according to claim 1, wherein
    a secret code number is recorded in advance on said credit card,
    said card processing means includes means for reading the secret code number of said credit card,
    said system for transaction settlement further comprising:
    input means for inputting said secret code number and said prepaid amount; and
    control means for checking whether or not the secret code number input from said input means is the same as the secret code number read from said card processing means, for transmitting said prepaid amount input from said input means to the credit center when the secret code numbers are the same.

3. A system for transaction settlement according to claim 1, wherein
    said transaction processing means is an automatic vending machine for automatically vending things, and
    wherein said subtracting means subtracts a sales amount of a thing from the prepaid amount written in said ID card in response to sales of a thing.

4. A method of transaction settlement, comprising the steps of:
    reading data required for margin transaction recorded on a credit card and writing amount data settled in accordance with the data to an ID card, and
    every time a margin transaction of a prescribed amount is done by using said ID card, subtracting amount data of the margin transaction from the amount data written in said ID card.

5. The method of claim 4, further comprising the step of using said ID card to identify a user.

6. The method of claim 4, further comprising the step of using said ID card to check attendance.

7. The method of claim 4, further comprising the step of using said ID card to control admission through a gate.

8. An apparatus for issuing a prepaid card for in-house use, said apparatus comprising:
    (a) receiving means for receiving a credit card and an in-house identification card;
    (b) reading means for reading credit information recorded on said credit card;
    (c) input means for inputting a credit amount;
    (d) determining means for determining, based on said credit information and said credit amount, whether said credit amount is within a credit limit amount;
    (e) writing means for writing a prepaid limit amount on said identification card, said prepaid limit amount corresponding to said credit amount, said writing means being operated in response to a determination by said determining means that said credit amount is within said credit limit amount; and
    (f) output means for outputting said identification card as said prepaid card.

9. The apparatus of claim 8, further comprising means for using said identification card to identify a user.

10. The apparatus of claim 9, further comprising means for using said identification card to check attendance.

11. The apparatus of claim 9, further comprising means for using said identification card to control admission through a gate.

12. A system for issuing a prepaid card for in-house use, said system comprising:
    a credit center and a card issuing apparatus;
    wherein said credit center includes:
        (a) receiving means for receiving credit information and a credit amount from said card issuing apparatus;
        (b) determining means for determining, based on said credit information and said credit amount, whether said credit amount is within a credit limit amount; and
        (c) transmitting means for transmitting a signal to said card issuing apparatus; and
    wherein said card issuing apparatus includes:
        (a) receiving means for receiving a credit card and an in-house identification card;

(b) reading means for reading said credit information from said credit card;

(c) input means for inputting said credit amount;

(d) transmitting means for transmitting said credit information and said credit amount to said credit center;

(e) writing means for writing, upon receipt of said signal from said credit center, a prepaid limit amount on said identification card, said prepaid limit amount corresponding to said credit amount; and (f) output means for outputting said identification card as said prepaid card.

13. A transaction settlement system, comprising:

a credit center, a card issuing apparatus, and an automatic vending machine;

wherein said credit center includes:

(a) receiving means for receiving credit information and a credit amount from said card issuing apparatus;

(b) determining means for determining, based on said credit information and said credit amount, whether said credit amount is within a credit limit amount; and (c) transmitting means for transmitting a signal to said card issuing apparatus;

wherein said card issuing apparatus includes:

(a) receiving means for receiving a credit card and an in-house identification card;

(b) reading means for reading said credit information from said credit card;

(c) input means for inputting said credit amount;

(d) transmitting means for transmitting said credit information and said credit amount to said credit center;

(e) writing means for writing, upon receipt of said signal from said credit center, a prepaid limit amount on said identification card, said prepaid limit amount corresponding to said credit amount; and (f) output means for outputting said identification card as a prepaid card; and wherein said vending machine includes:

(a) ID card receiving means for receiving said in-house identification card; and (b) subtracting means for subtracting a sales amount from said prepaid limit amount; and a card-operated system, said card-operated system being actuated by said in-house identification card, said card-operated system being separate from said automatic vending machine.

14. The system of claim 13, wherein said ID card receiving means includes a first card reader for reading said in-house identification card, and wherein said card operated system includes a second card reader for reading said in-house identification card, said second card reader being separate form said first card reader.

15. A transaction settlement method, comprising the steps of:

operating a credit center, a card issuing apparatus, and an automatic vending machine;

wherein said step of operating said credit center includes the steps of:

(a) receiving credit information and a credit amount from said card issuing apparatus;

(b) making a determination, based on said credit information and said credit amount, whether said credit amount is within a credit limit amount; and (c) transmitting a signal to said card issuing apparatus;

wherein said step of operating said card issuing apparatus includes the steps of:

(a) receiving a credit card and an in-house identification card;

(b) reading said credit information from said credit card;

(c) inputting said credit amount;

(d) transmitting said credit information and said credit amount to said credit center;

(e) receiving said signal from said credit center, and then writing a prepaid limit amount on said identification card, said prepaid limit amount corresponding to said credit amount; and (f) outputting said identification card as a prepaid card; and wherein said step of operating said vending machine includes the steps of:

(a) receiving said in-house identification card; and (b) subtracting a sales amount from said prepaid limit amount; and wherein said transaction settlement method further includes the step of using said in-house identification card to actuate a card-operated system, said card-operated system being separate from said automatic vending machine.

16. The method of claim 15, wherein said card-operated system includes a card reader, a sales processing terminal connected to said card reader, and means for recording a transaction made by said sales processing terminal, said step of using said in-house identification card to actuate said card-operated system including the step of inserting said identification card into said card reader.

17. The method of claim 15, wherein said card-operated system includes a card reader and an attendance check system connected to said card reader, said step of using said in-house identification card to actuate said card-operated system including the step of inserting said identification card into said card reader.

* * * * *